April 7, 1936.  J. GATTONI  2,036,689
ADJUSTABLE DAMPING MEANS FOR PRECISION BALANCE
Filed Dec. 30, 1933  6 Sheets-Sheet 1
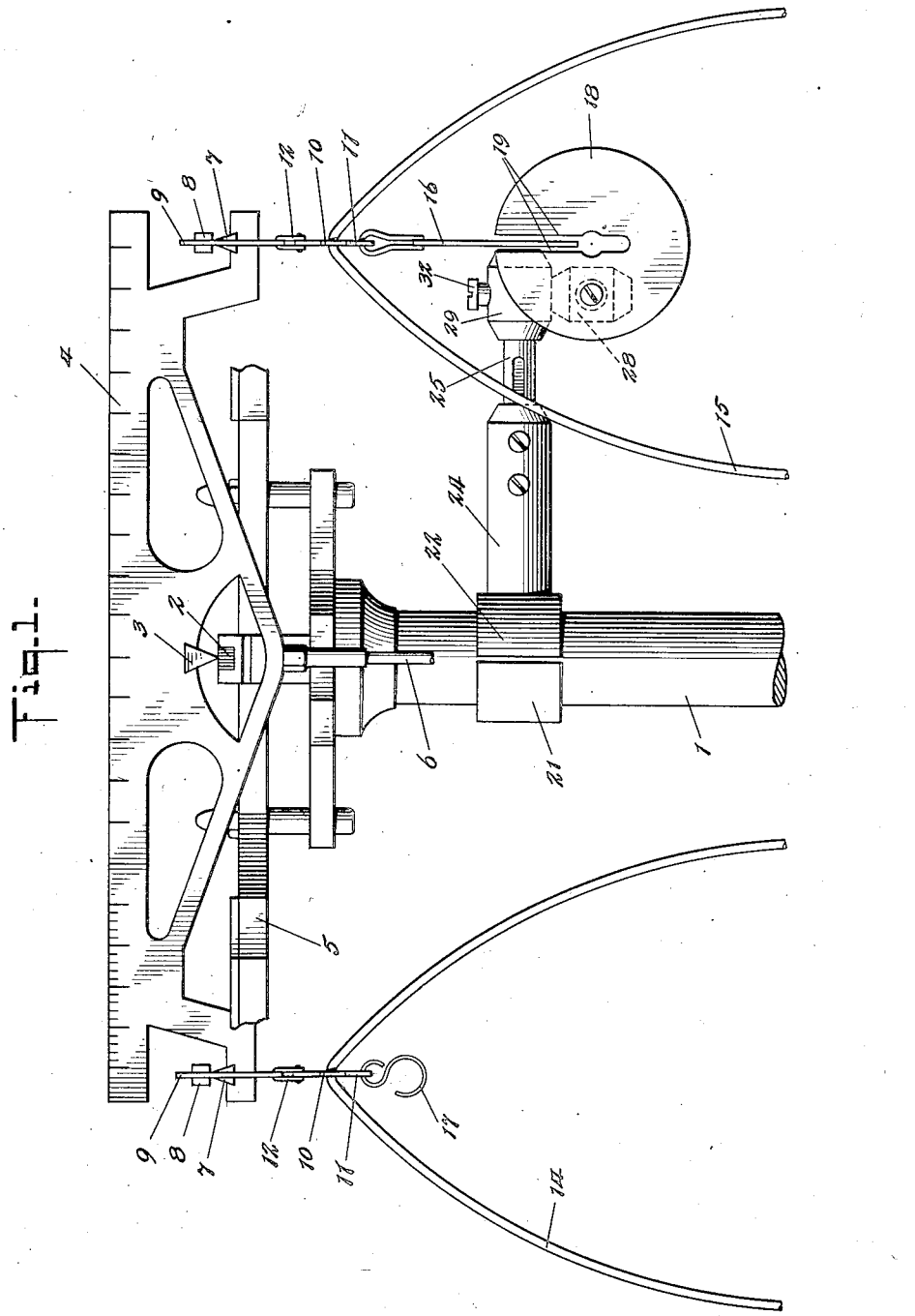
INVENTOR
JOHN GATTONI
BY 
ATTORNEY

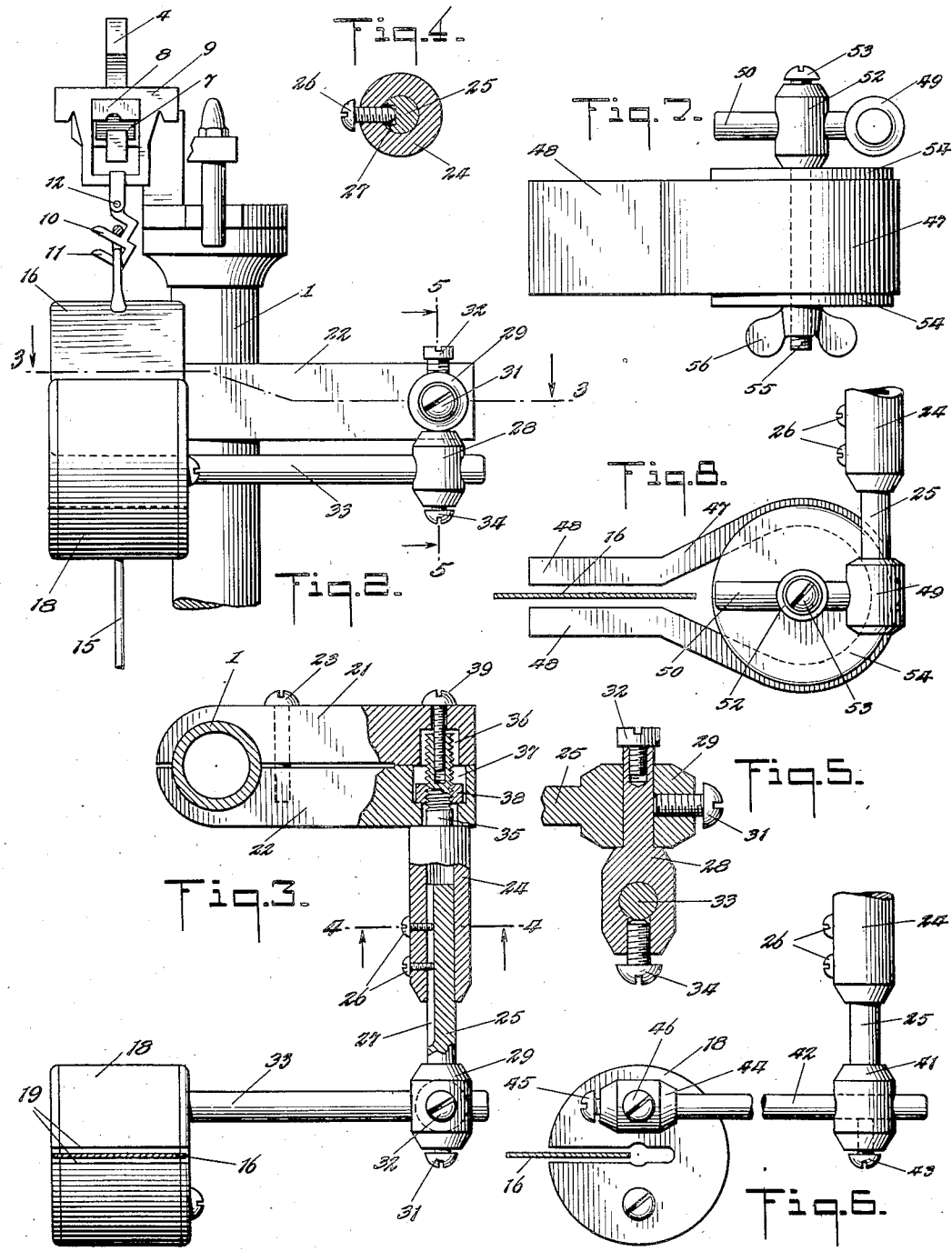

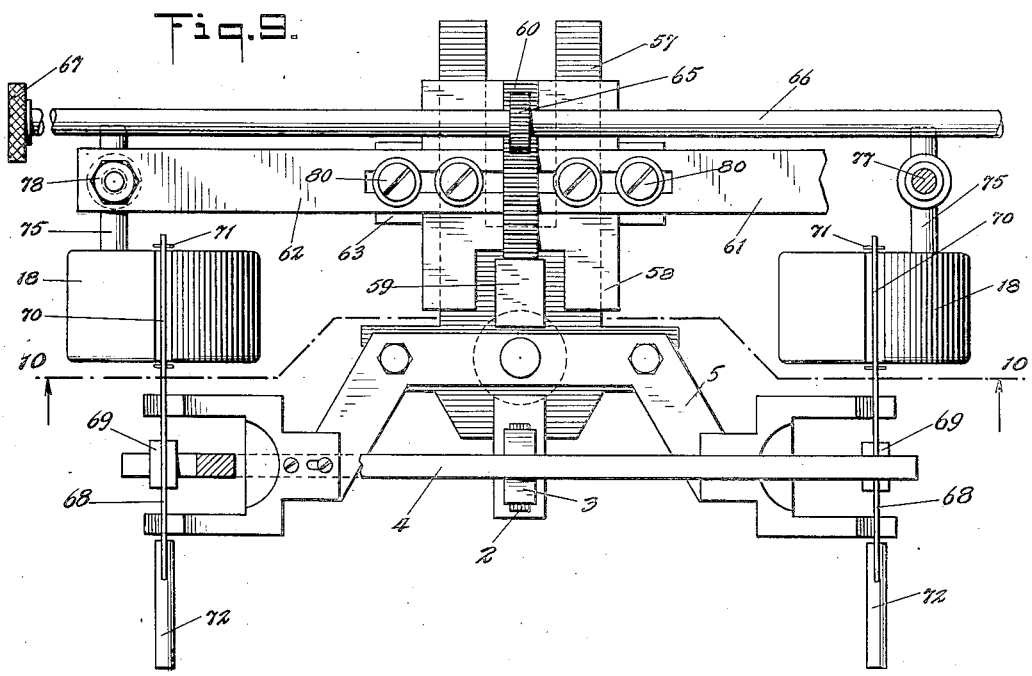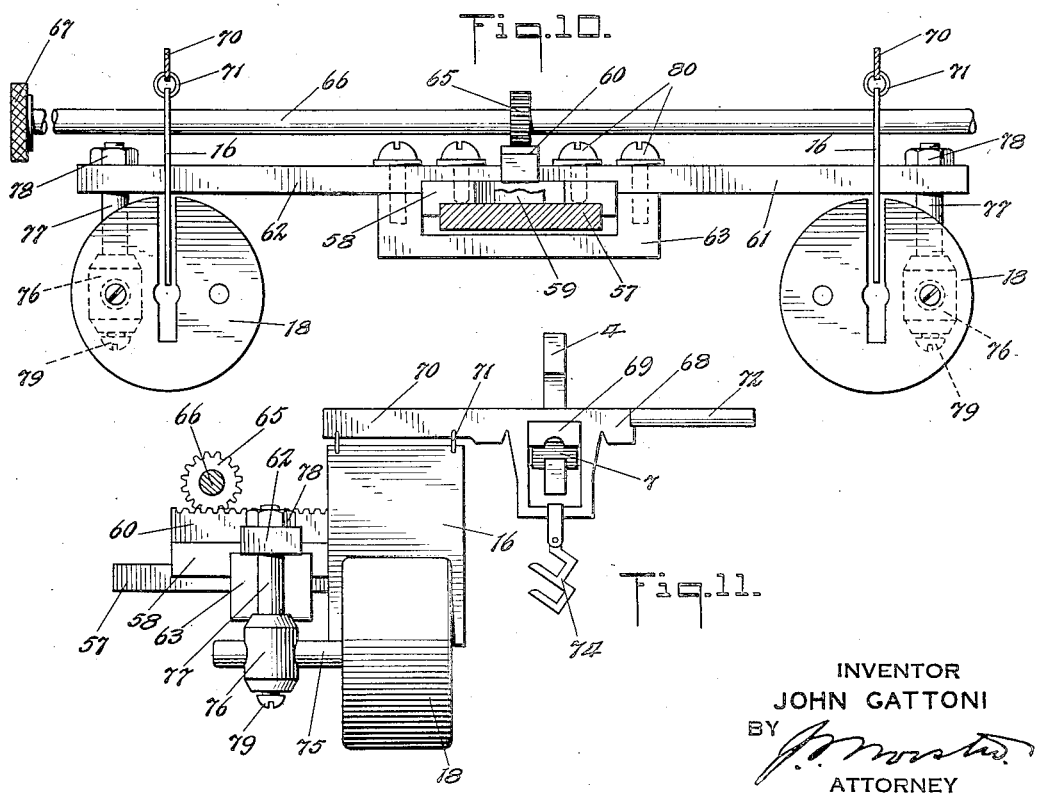

April 7, 1936.                    J. GATTONI                    2,036,689
            ADJUSTABLE DAMPING MEANS FOR PRECISION BALANCE
                  Filed Dec. 30, 1933        6 Sheets-Sheet 4
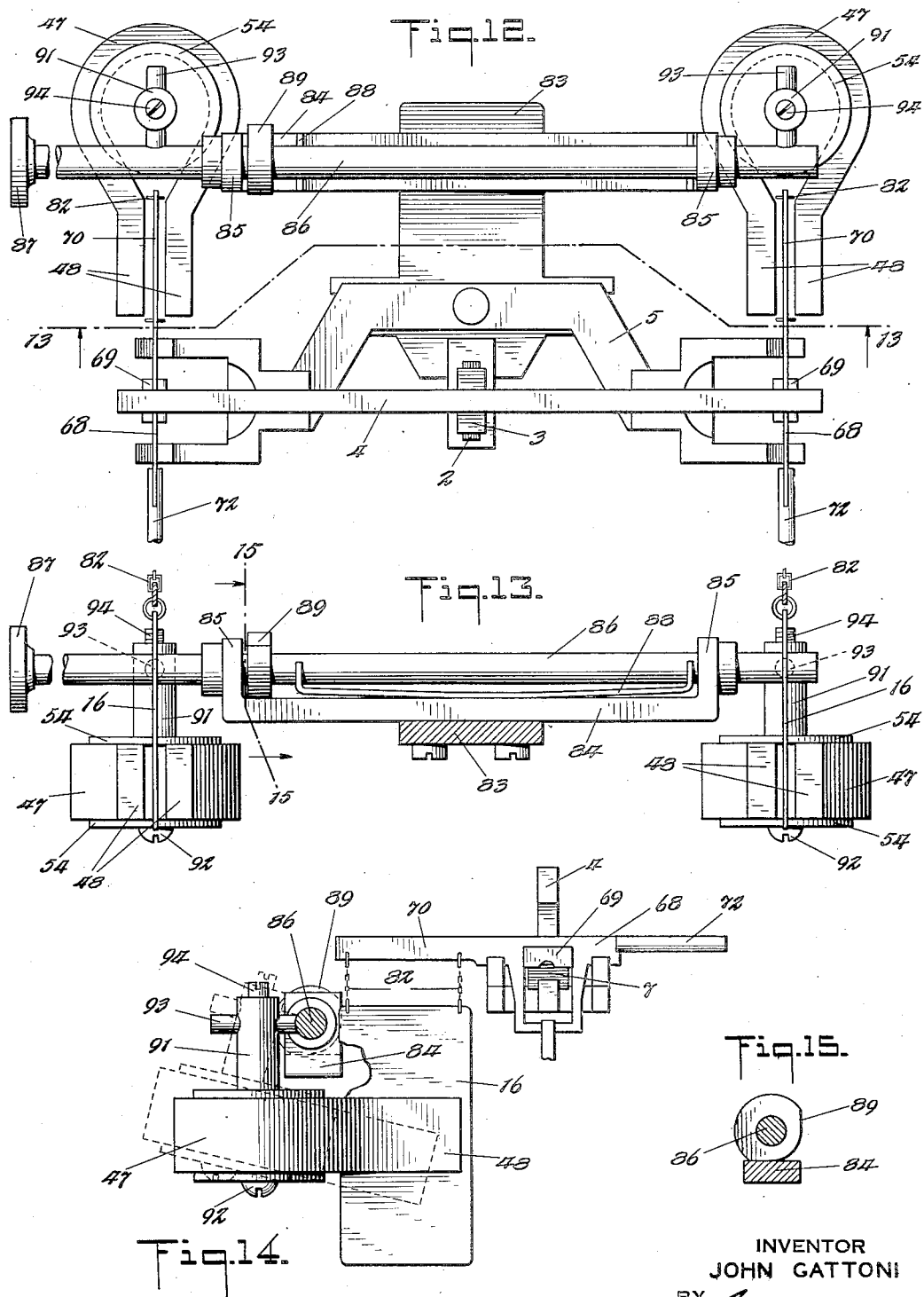
INVENTOR
JOHN GATTONI
BY 
ATTORNEY

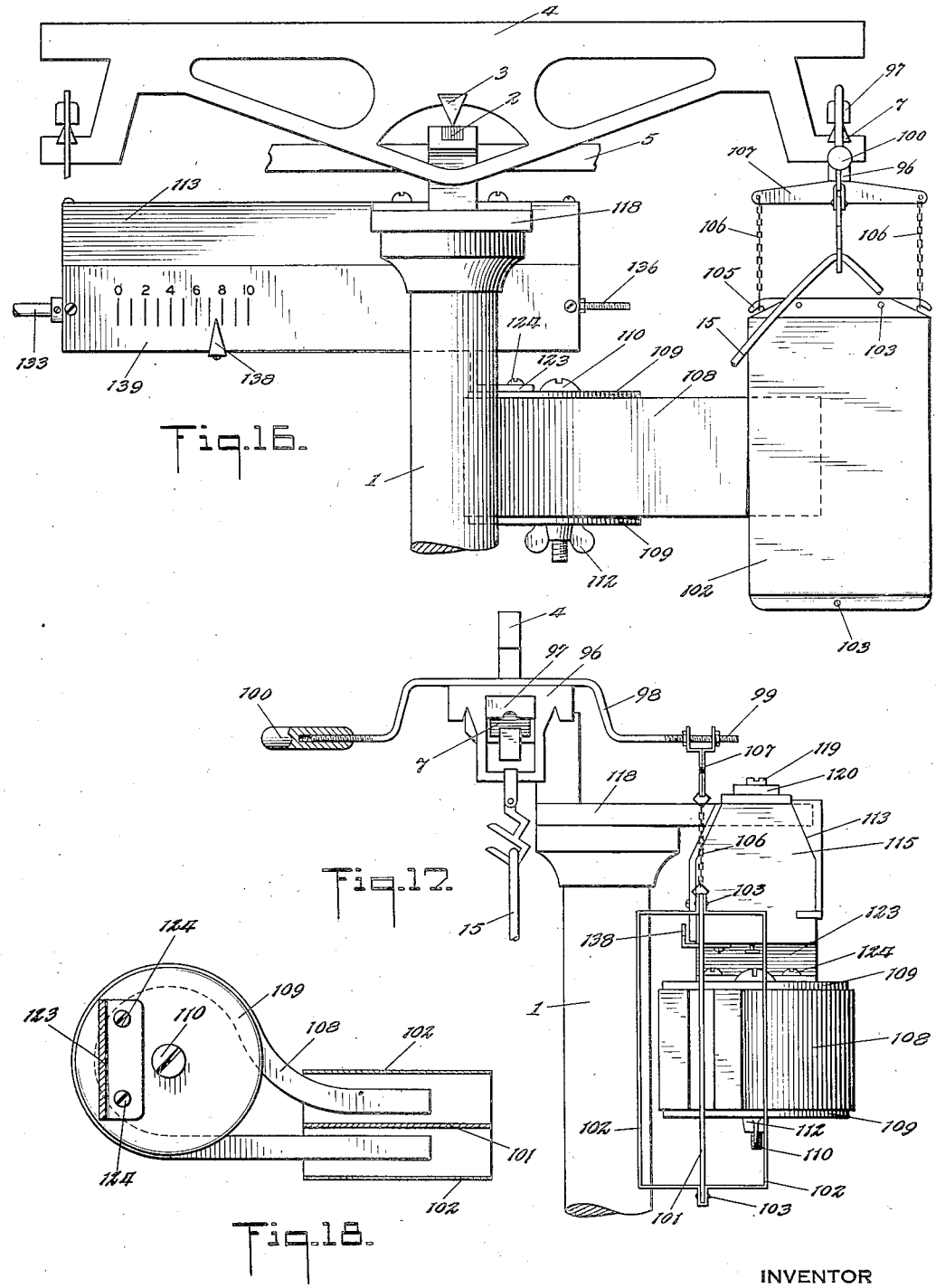

April 7, 1936.　　　　J. GATTONI　　　　2,036,689
ADJUSTABLE DAMPING MEANS FOR PRECISION BALANCE
Filed Dec. 30, 1933　　　6 Sheets-Sheet 6
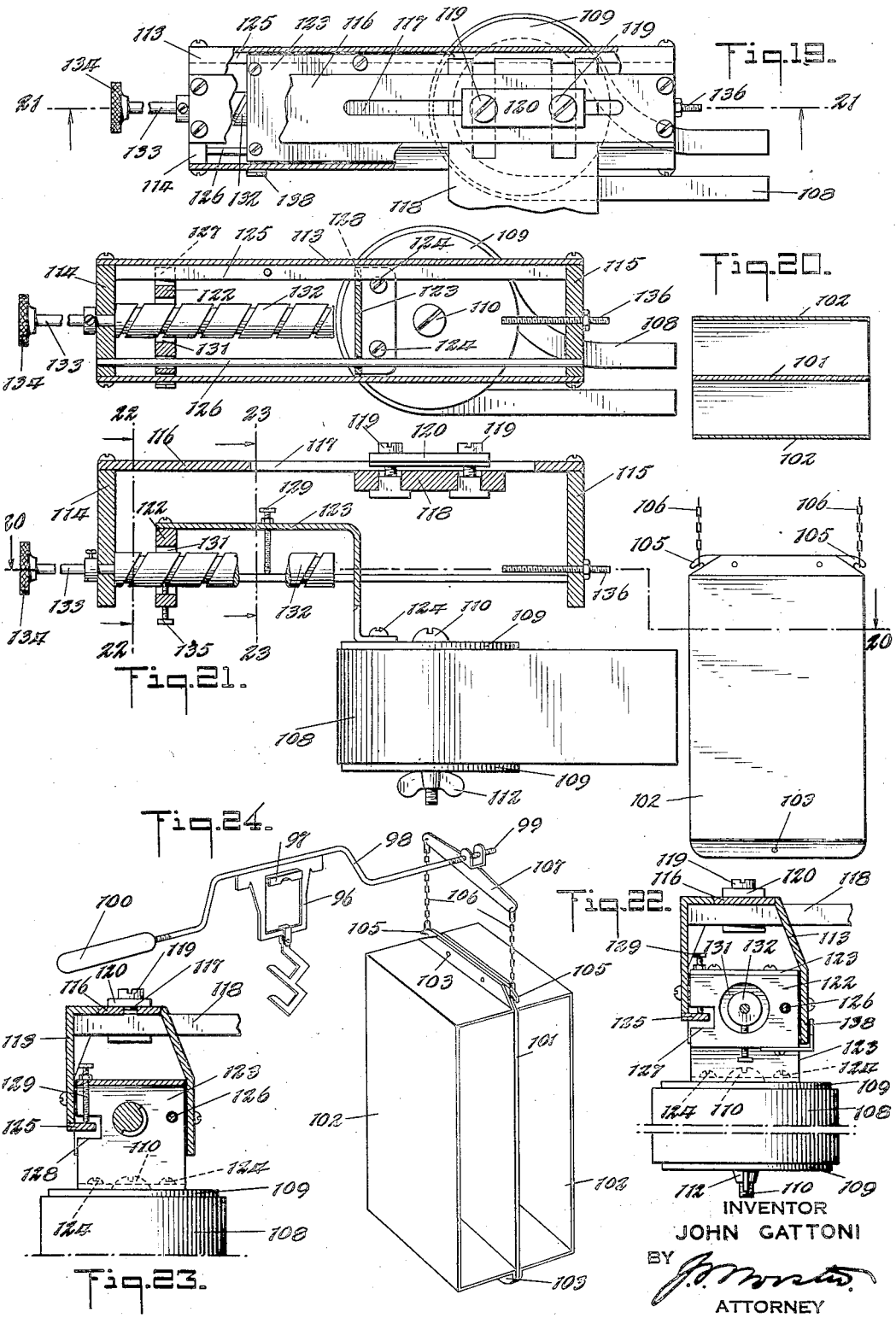
INVENTOR
JOHN GATTONI
BY
ATTORNEY Patented Apr. 7, 1936

2,036,689

UNITED STATES PATENT OFFICE 2,036,689

ADJUSTABLE DAMPING MEANS FOR PRECISION BALANCE

John Gattoni, Union City, N. J., assignor to Seederer-Kohlbusch, Inc., Jersey City, N. J., a corporation of New Jersey Application December 30, 1933, Serial No. 704,663

12 Claims. (Cl. 188—104)

This invention relates to magnetically damped precision balances of the type disclosed in my Patent #1,900,641, dated March 7, 1933, and has for its object to provide improved means for controlling the damping effect in such balances.

The balance disclosed in Patent #1,900,641 has a pivoted beam supporting the scale pans, a magnet mounted below the beam, and a damping plate pivotally suspended from the beam independently of the scale pans and arranged to move up and down between the poles of the magnet. The eddy currents set up by moving the plate through the magnetic field dampen the motion of the beam and bring the balance to rest in a few seconds whereas an undamped balance may take five minutes or longer to come to rest.

In the above balance the magnet may be adjusted with respect to the damping plate to vary the damping effect, this being desirable because the damping effect may vary under different load conditions and also because some operators prefer to let the balance swing for a longer or shorter time than others. My balance has gone into such wide use in scientific laboratories, colleges, etc., and is used for such a wide variety of weighing operations, that it is increasingly desirable to simplify and expedite the adjustment of the damping unit under all conditions of use. The present invention accomplishes this and also provides an improved magnet-damper combination which increases the damping effect.

I shall describe several modifications of my invention, some of which may easily be applied to existing undamped balances. In all forms of the invention improved means are provided for supporting the magnet and for adjusting it toward and away from the damping plate to obtain any desired damping effect. Another important feature of the mounting is that the magnet may be rotated vertically and horizontally to bring its poles into proper alignment with the damping plate. The various adjustments are made independently in a minimum of time and without special skill on the part of the operator.

These and various other features and advantages of the invention will be described in connection with the accompanying drawings, in which:

Fig. 1 is a front elevation of a balance embodying the invention;

Fig. 2 is an end view thereof;

Fig. 3 is a horizontal section taken on line 3—3 of Fig. 2;

Fig. 4 is a section taken on line 4—4 of Fig. 3, showing a detail of the adjustable magnet-supporting arm;

Fig. 5 is a vertical section taken on line 5—5 of Fig. 2, showing another detail of the magnet-supporting arm;

Fig. 6 is a plan view showing an alternative mounting of the magnet;

Fig. 7 is an end view showing a modified form of magnet and support;

Fig. 8 is a plan view of the assembly shown in Fig. 7;

Fig. 9 is a top plan view of a balance having a modified magnet adjusting mechanism;

Fig. 10 is a vertical section taken on line 10—10 of Fig. 9;

Fig. 11 is an end view looking into the left end of Fig. 9;

Fig. 12 is a top plan view of a balance having another form of magnet adjusting mechanism;

Fig. 13 is a vertical section taken on line 13—13 of Fig. 12;

Fig. 14 is an end view looking into the left end of Fig. 12;

Fig. 15 is a detail section taken on line 15—15 of Fig. 13;

Fig. 16 is a front elevation of a balance having a modified damping plate suspension and magnet adjusting mechanism;

Fig. 17 is an end view looking into the right end of Fig. 16;

Fig. 18 is a plan view of the magnet with the cooperating damping plate shown in section;

Fig. 19 is a plan view of the magnet adjusting mechanism of Fig. 16 with parts of the frame in section;

Fig. 20 is a horizontal section taken on line 20—20 of Fig. 21;

Fig. 21 is a vertical section taken on line 21—21 of Fig. 19;

Fig. 22 is a vertical section taken on line 22—22 of Fig. 21;

Fig. 23 is a vertical section taken on line 23—23 of Fig. 21; and

Fig. 24 is a perspective view of the damping plate and suspension used in Figs. 16 to 23.

In Figs. 1 to 5, the upright standard 1 has a knife edge bearing 2 pivotally supporting the knife edge 3 of beam 4. The standard carries the usual bridge or cradle 5 which is adapted to support the beam so as to avoid damaging the knife edge pivot when not in use. The beam also carries the usual pointer 6.

At the ends of the beam are knife edges 7 on which rest the knife edge bearings 8 of yoke frames 9. These yoke frames carry upper and lower hooks 10 and 11 which are pivoted thereto at 12 as best shown in Fig. 2. The scale pan bows 14 and 15 are hung on the upper hooks 10 of the respective yoke frames.

A damping plate 16 of aluminum or other non-magnetic material is freely suspended on the lower hook 11 of the yoke frame at either or both ends of the balance. The balance illustrated in Fig. 1 has only one damping plate 16 and hence the hook 11 at the opposite end of the balance carries a small weight 17 which exactly balances this damping plate.

Cooperating with damping plate 16 and mounted horizontally below beam 4 is a circular magnet 18 which is constructed in the shape of a cylinder having a deep and narrow longitudinal slot forming closely spaced poles 19 as shown in Fig. 1. The damping plate moves up and down in the slot between these poles which provide a concentration of flux in its path.

The magnet supporting unit comprises two mating clamp members 21—22 which are held together around standard 1 by screw 23; a horizontal sleeve 24 which is secured to said clamp as hereinafter described; an extension rod 25 which is adjustable lengthwise in sleeve 24 and may be locked against rotation by screws 26 engaging a key-way 27 in said rod; a post 28 which is swiveled in the enlarged end socket 29 of rod 25, being locked in adjusted position by screw 31 and having screw 32 at the top to prevent the post from dropping out of socket 29 when screw 31 is loosened; and a rod 33, carrying magnet 18, which is slidably mounted in post 28 and is locked in adjusted position therein by screw 34.

The connection between clamp 21—22 and sleeve 24 is shown in Fig. 3. The sleeve abuts against clamp member 22 and has a reduced threaded shank 35 fitting loosely into recesses 36 and 37 which are formed in the adjacent sides of clamp members 21 and 22. Recess 37 is enlarged so as to form a shoulder for lock nut 38 which is threaded on shank 35 of sleeve 24. In this way sleeve 24 may be rotated to the proper position with respect to clamp member 22 and secured thereto by lock nut 38. Clamp members 21 and 22 are then secured to standard 1 by screw 23 and further by screw 39 which extends through clamp member 21 and screws into shank 35 of sleeve 24.

Thus the elbow joint comprising clamp 21—22, sleeve 24, extension rod 25, swivel post 28 and slidable rod 33 may be adjusted quickly and accurately to move the magnet 18 either vertically or horizontally with respect to damping plate 16, or to rotate it vertically or horizontally so as to align the poles 19 with the damping plate. Vertical adjustment is effected by moving clamp 21—22 on standard 1, while horizontal adjustment parallel to beam 4 is effected by adjusting extension rod 25 in sleeve 24, and horizontal adjustment perpendicular to beam 4 or in the plane of damping plate 16 is effected by adjusting rod 33 in post 28. Rotation of magnet 18 in a vertical plane perpendicular to its own poles and to the damping plate 16 is accomplished by rotating rod 33 in post 28, while rotation of the magnet in a horizontal plane perpendicular to its poles and to the damping plate is accomplished by rotating post 28 in socket 29 of rod 25, this being the way to align the poles of the magnet with the damping plate. In all adjusted positions the magnet and support are clear of the bow 15 of the scale pan. After the magnet poles are properly aligned with the damping plate, the usual adjustment will be to move the magnet horizontally in the plane of the damping plate so as to get the plate symmetrically in the field when maximum damping effect is wanted or asymmetrically of the field when less damping effect is required.

In operation, the damping plate 16 moves in a vertical plane between the poles of the magnet 18 and the eddy currents set up by moving the plate through the field dampen the motion of the beam and quickly bring the balance to rest. The yoke frame 9 supports the damping plate 16 and the pan bow 15 independently of and out of contact with each other so that swinging movements of the scale pan are isolated from the damping plate and cannot force the damping plate against the magnet poles which would seriously affect the sensitivity and accuracy of the balance. In order to accomplish this, and at the same time produce exactly the right damping effect, it is necessary to adjust the magnet carefully and accurately with respect to the damping plate and this is accomplished by my invention in a minimum time and without special skill on the part of the operator.

The magnet support shown in Fig. 6 is somewhat similar to that described above except that it has some of its parts rearranged so as to support the magnet with its flat sides parallel to the floor of the balance. In this construction the extension rod 25 has an end socket 41 containing a horizontal aperture in which slidable rod 42 may be adjustably locked by screw 43. The other end of rod 42 has a socket 44 carrying a vertically slidable post which is fixed to the magnet. This post is locked in any desired vertical position by screw 45 and has a screw 46 at the top to prevent the post from dropping out of socket 44 when screw 45 is loosened. The post is not visible in the plan view of Fig. 6, being underneath socket 44, but it is similar to the post 28 of Fig. 5 except that its lower end is secured to the magnet. In this form of the invention the damping plate 16 moves up and down in a plane perpendicular to the flat sides of the magnet and the damping effect may be varied by moving the magnet to the right or left as viewed in Fig. 6, movement to the left increasing the damping effect and movement to the right decreasing it.

Figs. 7 and 8 show a modification of the invention employing a horseshoe magnet 47 having closely spaced poles 48. This support is clamped to the standard 1 in the manner previously described and has a sleeve 24 and adjustable extension rod 25 like the other supports. Rod 25, however, has an enlarged end socket 49 to which is fixed a stub rod 50 forming a right-angle elbow parallel to the floor of the balance. A socket 52 is slidably mounted on rod 50 and is secured in any adjusted position thereon by screw 53. The magnet is clamped between a pair of discs 54 and secured to socket 52 by bolt 55 and wing nut 56. The damping effect is varied by adjusting socket 52 along rod 50, a short rod being sufficient for this purpose since the magnet itself is long enough to reach the necessary distance between the legs of the pan bow 15. Other adjustments of the magnet are by rotary movement of sleeve 24, sliding movement of extension rod 25, and angular adjustment of the magnet between discs 54. All the foregoing magnet units may easily be applied to existing types of undamped balances.

In Figs. 9 to 11 the balance proper is similar to that previously described except that the bridge 5 has a rear extension 57 which forms a track for the backward and forward movement of a carriage 58 and has a stop block 59 to limit the movement of said carriage. The carriage has a rack 60, extension arms 61—62 parallel to the balance beam 4, and a brace 63 which supports and strengthens said arms. Meshing with rack 60 is a pinion 65 mounted on rotatable shaft 66 which extends outside the balance casing and is actuated by knob 67 for the purpose of adjusting the magnets.

The balance may be damped at either or both ends of beam 4 and for purposes of illustration I have shown damping plates 16 and cooperating magnets 18 at both ends of the beam. In this construction I use special yoke frames 68 having knife edge bearings 69 which rest on knife edges 7 at the ends of the beam, and having arms 70 which extend rearwardly of the beam. The damping plates 16 are pivotally suspended from arms 70 as by rings 71, and these arms and plates are counterbalanced by weights 72 which extend outwardly from the forward edges of the yoke frames. The scale pans are suspended from the yoke frames by means of hooks 74 shown in Fig. 11. The magnets 18 are secured to horizontal rods 75 which are adjustably mounted in sockets 76, these sockets being carried by vertical rods 77 which are suspended from the ends of extension arms 61—62 by means of nuts 78. The magnets 18 are initially adjusted by rotating horizontal rods 75 as required by sliding them forward or backward in the planes of the damping plates and locking them in adjusted position by means of screws 79; also by rotating vertical rods 77 to the desired position before tightening the nuts 78; and further by adjusting extension arms 61—62 to the right or left as viewed in Figs. 9 and 10, and locking them in adjusted position by tightening screws 80 which fasten them to carriage 58 and brace 63. Thereafter, the damping effect may be varied quickly and accurately by turning knob 67 of shaft 66, thereby moving carriage 58, extension arms 61—62 and magnets 18 in a horizontal direction with the magnets moving forward or backward in the planes of damping plates 16 or between right and left as viewed in Fig. 11.

In Figs. 12 to 15 the yoke frames 68 are constructed and mounted as in Figs. 9 to 11 except that the damping plates 16 are suspended from arms 70 by means of light chains 82. The bridge 5 has a rear extension 83 supporting arm 84 which extends parallel to beam 4. Arm 84 has upturned ends 85 forming bearings for rotatable shaft 86 which extends outside the balance casing and is actuated by knob 87 for the purpose of adjusting the magnets. A leaf spring 88 is sprung between arm 84 and shaft 86 to hold the shaft in any adjusted position. Shaft 86 carries cam 89 which cooperates with arm 84 to limit rotation of the shaft. In the form illustrated, I use horseshoe magnets 47 similar to that shown in Figs. 7 and 8 but circular magnets may be employed if desired. The magnets are clamped between discs 54 and fastened to posts 91 by screws 92, these posts being adjustably mounted on stub rods 93 carried by shaft 86 and being secured to said rods by screws 94. After the magnets are initially adjusted to align the poles with the damping plates, the damping effect is varied by turning knob 87 and thereby canting the magnets in a vertical plane as illustrated in dotted lines in Fig. 14.

The balance shown in Figs. 16 and 24 has another type of damping plate, suspension and control mechanism. The yoke frame 96 at one end of the beam has a bearing 97 which rests on knife edge 7 as previously described, and carries a rod 98 which extends beyond both edges of the yoke frame. This rod has one end threaded at 99 for attachment of the damping plate and the opposite end weighted at 100 to counterbalance the damping plate. The yoke frame carries the usual suspension hook or hooks for bow 15 of the scale pan. The damping unit comprises damping plate 101 and two U-shaped members 102, all made of aluminum or other non-magnetic material, which are riveted or otherwise secured together at 103 with plate 101 in the middle forming a box-like structure with open ends adapted to receive the poles of the magnet. The upper edge of plate 101 has hooks 105 for engagement with light chains 106 hung from a strap 107 which is adjustably screwed to the threaded end 99 of rod 98 in a plane perpendicular to yoke frame 96. Hence damping plate 101 is suspended in a plane parallel to beam 4 instead of being at right angles to the beam as in the balances previously described. The closely spaced poles of the magnet 108 extend inside the box-like damping unit on opposite sides of damping plate 101 which cuts through the concentrated portion of the magnetic field while the side shields 102 cut the outer lines of force and thereby increase the damping effect. Thus the poles of the magnet lie parallel to plates 101, 102 and to balance beam 4 and must be adjustable lengthwise of said beam in order to vary the damping effect. This adjustable mounting of the magnet will now be described.

The magnet 108 is a horseshoe magnet and is clamped between discs 109 by bolt 110 and wing nut 112. The adjusting mechanism is contained in a housing 113 having end plates 114 and 115 and a top plate 116 containing a longitudinal slot 117. This housing is adjustably mounted on a bracket 118 which is secured to the top of standard 1; bracket 118 extending through an opening in the front wall of housing 113 and being secured by screws 119 to a plate 120 which spans the slot 117 in top plate 116 of the housing as shown in Figs. 19 to 23. In this way the housing may be adjusted longitudinally, or between the left and right as viewed in Figs. 16, 19, 20, and 21, after which screws 119 are tightened to hold the housing in the adjusted position.

Housing 113 contains a movable carriage comprising a vertical plate 122 and an angular strap 123 having a depending portion which extends through the open bottom of the housing and is secured to magnet 108 by screws 124. The carriage runs on a double track composed of a horizontal flange 125 carried by the rear wall of housing 113 and a horizontal rod 126 which is secured to the end plates 114 and 115 of the housing. A notch 127 is formed in the edge of carriage plate 122 as shown in Fig. 22, and a similar notch 128 is formed in the depending portion of strap 123 as shown in Fig. 23, to allow the carriage to ride clear of track flange 125; and an adjustable screw 129, depending from the horizontal portion of strap 123, rides on track flange 125 and therefore constitutes the sole point of engagement between the carriage and said flange 125 as shown in Figs. 21 to 23. Screw 129, when adjusted, causes magnet 108 to rotate slightly in a vertical plane, making it possible to maintain the poles of the magnet in perfect vertical alignment with the damping plate.

The carriage plate 122 has a central opening 131 for the passage of a rotatable spiral cylinder 132 which is journaled in the end plate 114 of housing 113 and is actuated by control rod 133 extending outside the balance casing and having an operating knob 134. The carriage plate 122 is provided on its under side with a screw 135 which extends into the spiral groove of cylinder 132 as shown in Figs. 21 and 22 whereby the rotation of cylinder 132, caused by turning knob 134 propels the carriage and magnet 108 either to the right or left in Figs. 19 to 21 according to the direction in which the knob is turned. Movement to the right is limited by screw 136 which extends through end plate 115 of housing 113 and may be adjusted as desired; while movement to the left is limited by contact between the end of spiral cylinder 132 and the depending portion of carriage strap 123 as indicated in Figs. 20 and 21.

A pointer 138 is secured to carriage plate 122, extending through the bottom of housing 113 and moving over a scale 139 on the front of the housing. This enables the position of magnet 108, and hence the damping effect, to be determined instantly and accurately according to the position of the pointer.

The invention is capable of various other modifications and adaptations not specifically described but included within the scope of the appended claims.

The invention claimed is:

1. A magnet unit for magnetically damped balances comprising a support, means for adjustably clamping said support to an upright, an extensible arm carried by said support, a magnet having closely spaced poles for cooperation with a vertically movable damping plate, and a vertically and horizontally rotatable joint connecting said magnet to said arm for aligning the poles of said magnet with said damping plate.

2. A magnet unit for magnetically damped balances comprising a support, means for adjustably clamping said support to an upright, a sleeve carried by said support, an extensible rod adjustable in said sleeve, a magnet having closely spaced poles for cooperation with a vertically movable damping plate, and a vertically and horizontally rotatable joint connecting said magnet to said rod for aligning the poles of said magnet with said damping plate.

3. In a balance, a pivoted beam, a magnet having closely spaced poles mounted below said beam, a damping plate freely suspended from said beam and adapted to move in a vertical plane between the poles of said magnet to dampen the motion of said beam, and means for rotating said magnet in a vertical plane perpendicular to said damping plate to align said poles with said damping plate.

4. In a balance, a pivoted beam, a magnet having closely spaced poles mounted below said beam, a damping plate freely suspended from said beam and adapted to move in a vertical plane between the poles of said magnet to dampen the motion of said beam, and means for rotating said magnet in vertical and horizontal planes perpendicular to said damping plate to align said poles with said damping plate.

5. In a balance, a pivoted beam, a magnet having closely spaced poles mounted below said beam, a damping plate freely suspended from said beam and adapted to move in a vertical plane between the poles of said magnet to dampen the motion of said beam, means for rotating said magnet in a vertical plane perpendicular to said damping plate to align said poles with said damping plate and means for moving said magnet horizontally to vary the damping effect.

6. In a balance, a pivoted beam, a magnet having closely spaced poles mounted below said beam, a damping plate freely suspended from said beam and adapted to move in a vertical plane between the poles of said magnet to dampen the motion of said beam, means for rotating said magnet in vertical and horizontal planes perpendicular to said damping plate to align said poles with said damping plate, and means for moving said magnet horizontally to vary the damping effect.

7. In a balance, a pivoted beam, a vertical damping plate freely suspended from said beam, a magnet having closely spaced poles adapted to lie on opposite sides of said damping plate to dampen the motion of said beam, a carriage supporting said magnet and adapted to be moved toward and away from said damping plate to vary the damping effect, and means for adjusting said magnet to align said poles with said damping plate.

8. In a balance, a pivoted beam, a vertical damping plate freely suspended from said beam, a magnet having closely spaced poles adapted to lie on opposite sides of said damping plate to dampen the motion of said beam, a carriage supporting said magnet and adapted to be moved toward and away from said damping plate to vary the damping effect, a track for said carriage and means for adjusting said carriage on said track in a direction to align the poles of said magnet with said damping plate.

9. In a balance, a pivoted beam, a vertical damping plate freely suspended from said beam, a magnet having closely spaced poles adapted to lie on opposite sides of said damping plate to dampen the motion of said beam, a carriage supporting said magnet and adapted to be moved toward and away from said damping plate to vary the damping effect, a track for said carriage, means for adjusting said carriage vertically on said track to align the poles of said magnet with said damping plate, and means for rotating said magnet horizontally on said carriage.

10. In a balance, a pivoted beam, a vertical damping plate freely suspended from said beam, a magnet having closely spaced poles adapted to lie on opposite sides of said damping plate to dampen the motion of said beam, a carriage supporting said magnet and adapted to be moved toward and away from said damping plate to vary the damping effect, a track for said carriage, means for adjusting said carriage on said track in a direction to align the poles of said magnet with said damping plate, a rotatable shaft and means actuated by said shaft for moving said carriage on said track.

11. In a balance, a pivoted beam a magnet having closely spaced poles mounted below and parallel to said beam, means for moving said magnet longitudinally of said beam, and an open-ended boxlike damping unit freely suspended from said beam and having vertical sides and a central vertical partition parallel to said beam and adapted to enclose the poles of said magnet to dampen the motion of said beam.

12. A damping unit for magnetically damped balances comprising a four-sided boxlike structure composed of non-magnetic material, having its ends open to receive the poles of a horseshoe magnet and having a central partition extending between its ends to lie between said poles, and means for suspending said damping unit from a beam.

JOHN GATTONI.